United States Patent [19]
Staggs

[11] 3,735,649
[45] May 29, 1973

[54] PARTING BLADE WIRE STRIPPER

[76] Inventor: Jesse D. Staggs, R.R. 2, Box 143, Fallbrook, Calif. 92028

[22] Filed: May 27, 1970

[21] Appl. No.: 41,021

[52] U.S. Cl. ................................................81/9.5 A
[51] Int. Cl. ................................................H02g 1/12
[58] Field of Search ........................81/9.5 A, 9.5 M

[56] References Cited

UNITED STATES PATENTS

| 3,226,815 | 1/1966 | Kelly | 81/9.5 A |
| 3,344,691 | 10/1967 | Staggs | 81/9.5 A |
| 3,363,309 | 1/1968 | Logan et al | 81/9.51 |

Primary Examiner—James L. Jones, Jr.
Attorney—Lindenberg, Freilich & Wasserman

[57] ABSTRACT

A wire stripper for stripping insulation off one end of a wire without necessitating hard gripping of adjacent insulation, thereby preventing damage to the adjacent insulation. The stripper includes two sets of blades for closing against the insulated wire, and then separating while closed on the wire, each set of blades constructed to cut into the insulation. One set of blades which moves along the insulated central conductor when the sets of blades separate has a slightly larger opening than the other set of blades, to reduce the possibility of scratching the conductor.

2 Claims, 7 Drawing Figures

PATENTED MAY 29 1973

INVENTOR.
JESSE D. STAGGS

BY
Lindenberg Freilich & Wasserman

ATTORNEYS

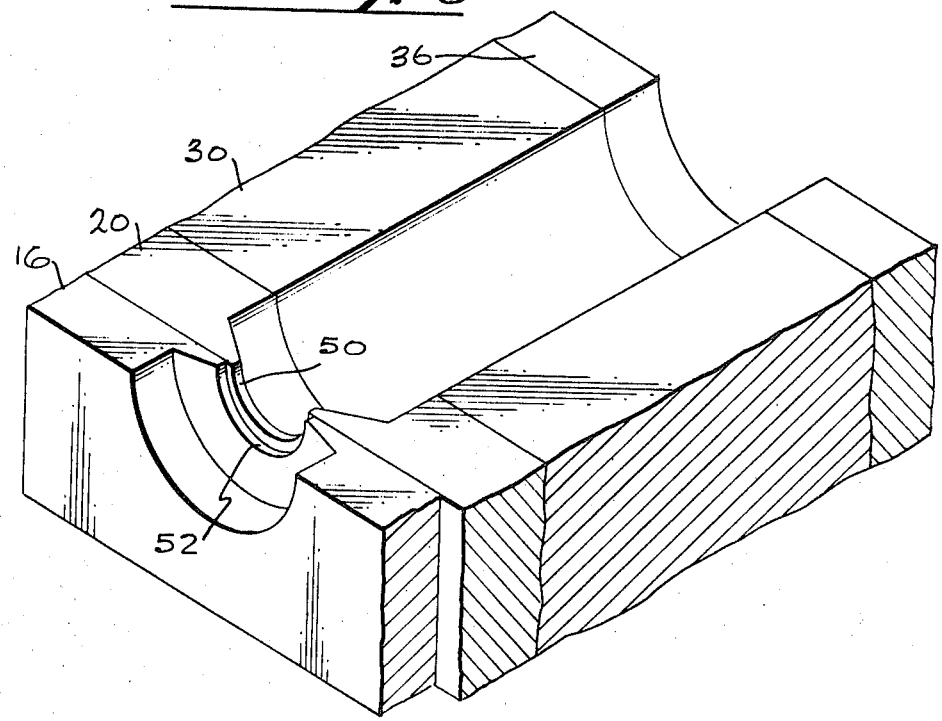
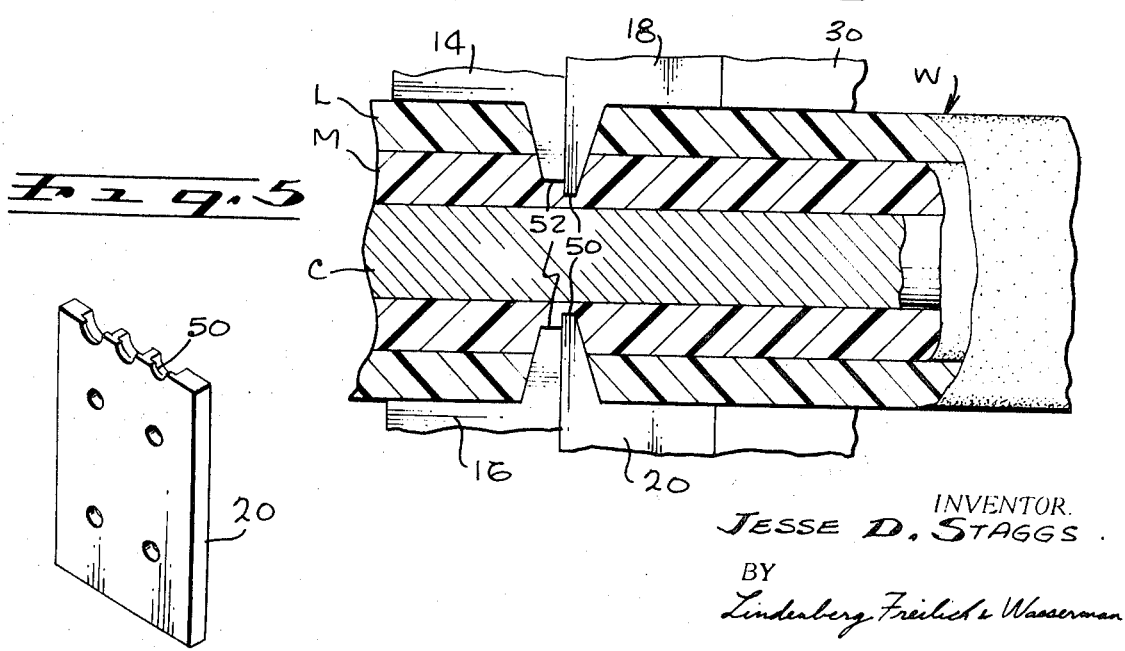

PARTING BLADE WIRE STRIPPER

BACKGROUND OF THE INVENTION

1. Field of the Invention

This invention relates to wire strippers.

2. Description of the Prior Art

One type of commonly used wire stripper employs a set of cutting blades for cutting into the insulation around the conductor, a set of clamping blades that clamp the insulation adjacent to the cutting blades, and means for separating the two sets of blades so that the cutting blades push off a piece of insulation. The tight clamping of insulation along a region behind the bared conductor end can cause damage to the insulation. The possibility of damage is especially great in the case of wires with two insulation layers including a tough inner layer, used in high performance applications, that requires very hard clamping during stripping. Generally, the clamping blades have serrations which leave an unwanted impression, the serrations being provided because even higher clamping forces would otherwise be required.

In addition to damage to the insulation immediately behind the bared conductor, present stripping devices sometimes cause damage to the bared conductor. This is because the cutting blades cut to a depth which brings them very close to the inner conductor and they can produce nicks and scratches in the conductor as they move therealong to push off a piece of insulation.

SUMMARY OF THE INVENTION

In accordance with the present invention, a wire stripper is provided which strips off an end piece of insulation from a conductor in a manner that produces a minimum of damage to the conductor and to insulation which remains thereon.

The stripper includes two sets of cutting blades, both of which cut into the insulation, and means for separating the blades so that a piece of insulation is pushed off the wire. The use of an additional set of cutting blades instead of clamping blades allows the insulation to be held by reason of one set of blades abutting an end of the insulation, instead of necessitating tight closing of clamping blades to prevent their sliding along the insulation. The possibility of damage to the insulation immediately behind the bared conductor by reason of high clamping pressures, is thereby eliminated.

In accordance with one embodiment of the invention, the set of cutting blades which moves along the conductor to push off insulation, has a slightly larger opening than the other set of cutting blades which remains stationary on the conductor. This reduces the possibility of damage to the conductor as the moving set of cutting blades passes along the bared conductor in pushing off insulation.

The novel features of the invention are set forth with particularity in the appended claims. The invention will be best understood from the following description when read in conjunction with the accompanying drawings.

BRIEF DESCRIPTION OF THE DRAWINGS

FIG. 5 is a perspective view of a lower cutting blade of the wire stripper of FIG. 1;

FIG. 6 is a fragmentary perspective view of the lower cutting blades of the wire stripper of FIG. 1; and FIG. 7 is a sectional side view of the cutting blades of FIG. 1 during the initial stage of wire stripping.

DESCRIPTION OF THE PREFERRED EMBODIMENTS

Figure 1:
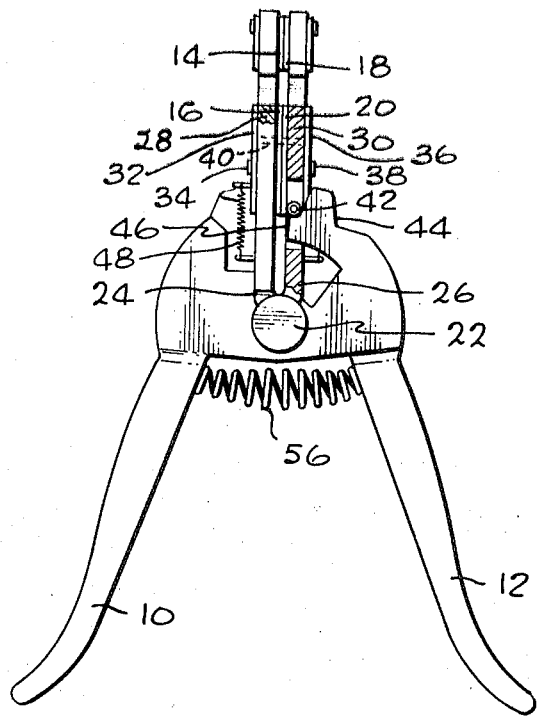
FIG. 1 is a front elevation view of a wire stripper constructed in accordance with the present invention, shown in an initial position for receiving a wire to be stripped.
Figure 2:
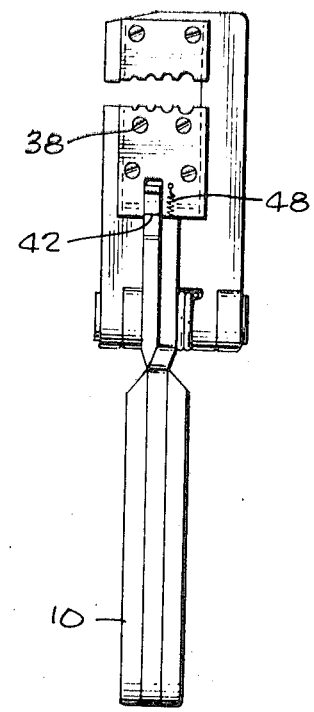
FIG. 2 is a side elevation view of the wire stripper of FIG. 1.
Figure 4:
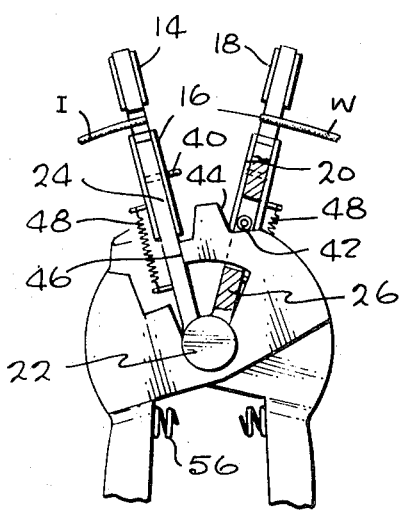
FIG. 4 is a view similar to that of FIG. 3, but showing the wire stripper in a fully operated position.

FIGS. 1 and 2 show the wire stripper structure, which includes a pair of handles 10, 12 that can be squeezed together to strip insulation from the end of a wire. As the handles are squeezed together, a first set of blades 14, 16 is closed against the wire while a second set of blades 18, 20 is also closed against the wire. As squeezing of the handles progresses, the first and second set of blades are separated to push off a piece of insulation from an end of the wire. The apparatus for closing the blades and then moving them apart is described in detail in my U.S. Pat. No. 3,344,691 entitled, "CAM OPERATED WIRE STRIPPER," so that only a brief description of this mechanism will be given here. The two sets of blades, however, are constructed in a novel manner, which will be described in greater detail below.

The wire stripper mechanism is essentially symmetrical so that whatever structure is described for one side exists on the other. The handles 10, 12 are supported for pivoting about a pivot pin 22. Also pivotally mounted on the pin are two guides 24, 26 which extend parallel and close to one another when the handles 10, 12 are in their initial, unsqueezed position. A pair of carriages 28, 30 can slide up and down within substantially rectangular openings in the guides 24, 26.

The carriage 28 is slidably mounted on its guide 24 by the cutting blades 16 and a plate 32, the blade and plate being positioned on opposite sides of the guide 24 and held together by screws 34 that pass through the carriage 28. In a similar manner, the carriage 30 is slidably mounted by the blade 20 and a plate 36 on opposite sides of the guide 26, that are held by screws 38. The carriages 28, 30 move upwardly together so that the first and second sets of blades 14, 16 and 18, 20 close together. Such movement of both sets of blades together is secured by a pin 40 which is fixed to one of the carriages 28 and extends into a hole in the other carriage 30.

Figure 3:
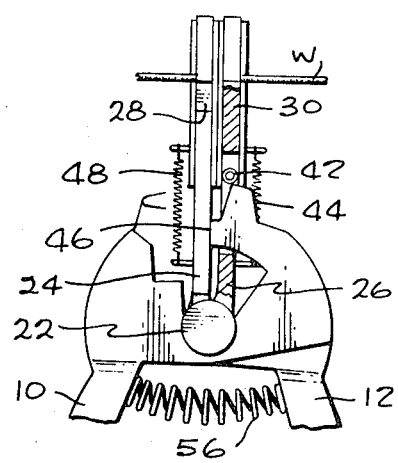
FIG. 3 is a partial front elevation view of the wire stripper of FIG. 1, but showing it in a partially operated position during stripping.

Upward movement of the carriages is caused by a cam follower 42 mounted near the bottom of each carriage, which can ride on camming surfaces 44 of each handle. As the handles are closed together, the cam follower 42 is pushed upwardly, and it moves the carriages 28, 30 up to close the two sets of blades over a wire placed between them. Such a position of the apparatus is shown in FIG. 3. As the cam follower 42 reaches its highest position, a surface 46 on each handle has been rotated to a position to press against one of the guides, so that further squeezing of the handles causes the guides 24, 26 to separate. Accordingly, the guides 24, 26 move apart, causing insulation to be pushed off one end of the wire that is being stripped. After a predetermined separation of the guides, the cam follower 42 moves downwardly along the cam surface 44, to the position shown in FIG. 5, thereby allowing the carriages 28, 30 to move down under the force of springs 48. The two sets of blades are then open to allow the wire W and the stripped-off insulation I to be removed.

FIGS. 5, 6 and 7 illustrate portions of the first set of blades 14, 16 and second set of blades 18, 20 which closely engage the wire W. Each set of blades has cutting regions which cut into the insulation surrounding the central conductor C of the wire. The particular wire shown has an outer insulation portion L and an inner insulation portion M which surround the conductor C. The cutting edges 50 of the second set of cutting blades 18, 20 penetrate both insulation layers, and to a depth which is close to the surface of the conductor C. The first set of blades 14, 16 also has a cutting edge 52 that penetrates through both insulation layers. However, the first set 14, 16 penetrates to a lesser depth so that the cutting edges 52 are spaced somewhat further from the surface of the conductor C. The adjacent surfaces of the blades 14, 18 and 16, 20 are flat, and the cutting edges 50, 52 are adjacent to each other, so that when both sets of blades are closed there is substantially no uncut region of insulation between them.

When the two sets of blades are separated, while each is closed, each set of blades abuts an end of the insulation where it is cut, to separate the insulation portions. The second set of blades 18, 20 generally is positioned nearest the major portion of the wire while the first set 14, 16 is positioned nearest the end of the wire where insulation is to be removed. When the blades separate, the second set of blades remains stationary with respect to conductor C, while the first set 14, 16 moves axially along the central conductor C to push off an end piece of insulation. At the beginning of such movement, the thin uncut wire region lying between the conductor C and the cutting edge 50 of the second set of blades is torn completely through.

The cutting edges 52 of the first set of cutting blades defines a hole which is slightly larger than the hole defined by the cutting edges 50 of the second set of blades. This disparity of hole diameters has several advantages. First, the fact that the cutting edges 52 of the first set of blades can be made somewhat larger reduces the possibility of the cutting edges 52 scratching the conductor C as they move along it. This is especially important where the conductor C is formed by many small strands which are highly subject to breakage when nicked. Another advantage is that only the second set of blades 18, 20 has a somewhat critical hole diameter, that is, a hole diameter that must be larger than the conductor C, but not too much larger. Also, extreme stresses in the inner insulation are concentrated along a narrower region (at edges 50) so that tearing of the insulation occurs at a smaller region and the cut is neater. Generally, both cutting edges 50, 52 should penetrate deeply into the insulation, and the first set of blades 14, 16 should have an opening no more than on the order of 50 percent greater than the opening defined by the second set of blades. Of course, each set of cutting blades can be provided with several holes for cutting wires of a variety of diameters of inner conductors C.

Thus, the invention provides a wire stripper with two sets of blades for closing against the wire and then separating to remove insulation, wherein both sets of blades cut into the insulation. Each of the blades can push against an end of the insulation, and this eliminates the need for a set of clamping blades that must clamp the outside of the insulation near where the insulation is cut. The two sets of cutting blades preferably are held so that they cut into adjacent regions of the insulation, so all cutting is concentrated in a limited region and there is substantially no uncut region or plane of insulation between the sets of blades. In many cases, one set of blades which is intended to move along the inner conductor, has a central hole which is slightly larger than the hole defined by the other set of cutting blades, to reduce the possibility of damage and provide a neater job. Of course, a variety of operating mechanism can be utilized for closing the two sets of blades and for separating them, including those operated manually or by electric or air power. The stripper can be used with a wide variety of insulated wires, having a single or multiple layer of insulation.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A wire stripper comprising:
   first and second blade guide means:
   a first set of cutting blades mounted on said first guide means for sliding together to cut into the insulation of a wire placed between them;
   a second set of cutting blades mounted on said second guide means for sliding together to cut into the insulation of a wire between them, each of said sets of cutting blades having a deepest-penetrating cutting region disposed adjacent to the deepest-penetrating cutting region of the other set of blades when said blade guide means are in said first position; and
   means for operating said guide means and sets of blades, including means for positively fully closing both of said sets of cutting blades while said guide means are in said first position and only then moving said sets of blades apart, whereby to assure that both sets of blades will cut deeply into insulation.

2. The wire stripper described in claim 1 wherein: said cutting region of said first set of blades defines a hole having a greater diameter than the hole defined by said second set of blades.

* * * * *